(12) United States Patent
Huang (10) Patent No.: US 10,910,886 B2
(45) Date of Patent: Feb. 2, 2021

(54) HEATING SYSTEM WITH WIRELESS COMMUNICATION FUNCTION

(71) Applicants: TENX (SHENZHEN) TECHNOLOGY LIMITED, Guangdong (CN); TENX TECHNOLOGY INC., New Taipei (TW)

(72) Inventor: Cheng-Hung Huang, Hsinchu (TW)

(73) Assignees: HITENX (WUXI) TECHNOLOGY CO., LTD., Jiangsu (CN); TENX (SHENZHEN) TECHNOLOGY LIMITED, Guangdong (CN)

( * ) Notice: Subject to any disclaimer, the term of this patent is extended or adjusted under 35 U.S.C. 154(b) by 311 days.

(21) Appl. No.: 16/120,338

(22) Filed: Sep. 3, 2018

(65) Prior Publication Data

US 2020/0076247 A1   Mar. 5, 2020

(51) Int. Cl.
*H05B 6/12* (2006.01)
*H02J 50/80* (2016.01)
(Continued)

(52) U.S. Cl.
CPC .............. *H02J 50/80* (2016.02); *H01F 27/36* (2013.01); *H01F 38/14* (2013.01); *H02J 7/025* (2013.01); *H02J 50/10* (2016.02); *H05B 1/0269* (2013.01)

(58) Field of Classification Search
CPC ........ H01F 27/36; H01F 27/365; H01F 38/14; H01F 2038/143; H02J 7/025; H02J 50/10; H02J 50/12; H02J 50/80; H05B 6/06; H05B 6/062; H05B 6/12; H05B 6/1209; H05B 6/1236; H05B 6/1245; H05B 6/1281; H05B 1/0269; Y02B 40/00; Y02B 40/123
USPC ..... 219/429, 432, 433, 448.17, 448.18, 620, 219/621, 624, 628, 630, 675, 448.13, 219/448.14, 448.16; 99/275, 279, 323.3, 99/DIG. 14
See application file for complete search history.

(56) References Cited

U.S. PATENT DOCUMENTS 8,395,098 B2 * 3/2013 Pan ........................... H05B 6/12
                                                    219/620
9,035,222 B2 * 5/2015 Alexander ............ A47J 36/321
                                                    219/432

(Continued)

*Primary Examiner* — Hung D Nguyen
(74) *Attorney, Agent, or Firm* — Li & Cai Intellectual Property (USA) Office (57) ABSTRACT

A heating system with wireless communication function includes a wireless information transmitting device, a wireless charging transmitting device and a wireless receiving heating device. The wireless information transmitting device includes an external shell, an information transmitting end coil and an information transmitting end magnetic shield. The wireless receiving heating device is disposed on a top surface of the wireless charging transmitting device. The wireless charging transmitting device includes a shell, a transmitting end coil and a transmitting end magnetic shield. The wireless charging transmitting device transmits energy to the wireless receiving heating device by near field induction and the object within the accommodating part of the wireless receiving heating device can be heated. The wireless receiving heating device notifies the wireless charge heating device to increase or decrease energy transmission in a digital communication manner.

10 Claims, 8 Drawing Sheets

(51) Int. Cl.
*H02J 7/02* (2016.01)
*H05B 1/02* (2006.01)
*H01F 38/14* (2006.01)
*H02J 50/10* (2016.01)
*H01F 27/36* (2006.01)
*F27D 11/00* (2006.01)

(56) References Cited

U.S. PATENT DOCUMENTS

| | | | |
|---|---|---|---|
| 2010/0119668 A1* | 5/2010 | Maupin | A23L 3/005 |
| | | | 219/621 |
| 2014/0292101 A1* | 10/2014 | Baarman | H05B 6/10 |
| | | | 307/104 |
| 2015/0257576 A1* | 9/2015 | Yorukoglu | A47J 36/00 |
| | | | 219/624 |
| 2016/0286610 A1* | 9/2016 | Eissner | A47J 27/2105 |

\* cited by examiner

HEATING SYSTEM WITH WIRELESS COMMUNICATION FUNCTION

FIELD OF THE DISCLOSURE

The present disclosure relates to a heating system with wireless communication function, and more particularly to a heating system with wireless communication capable of transferring wireless information.

BACKGROUND OF THE DISCLOSURE

Currently, in a related art, a conventional heating device is to transmit electric energy in a wired manner. Thereafter, the electric energy is converted into thermal energy to perform a heating function. Common applications include space heating, cooking or heat preserving, and heating components are included in all kinds of electric heating devices. Normally, electric currents are transmitted through an electric resistor to generate heat to be applied in the conventional heating device. For example, in a Universal Serial Bus (USB) insulation coaster, the wired electric energy transmission is conventionally used to perform heating. However, a contact problem exists between the USB insulation coaster and an object to be heated. When a contacting area between the USB insulation coaster and the object to be heated is smaller, the thermal transmitting effect is poor and the temperature of the object to be heated cannot be effectively controlled.

Taking a thermos bottle as an example, a battery and a heater are built-in within a bottom portion of the thermos bottle. In order to maintain the temperature of the drink inside the bottle, a wired electric energy transmission is used to charge the battery at the bottom portion of the thermos bottle and the battery transmits the electric energy to the heater to effectively control the temperature of the object to be heated. However, the wired manner requires time to charge the battery, and the heating time is limited due to battery capacity, so that the cost is high and the hardware structure would need to include a charging wire for the battery and a wire to connect to the heater. Therefore, the efficiency of energy conversion is poor and in need of improvement.

SUMMARY OF THE DISCLOSURE

In response to the above-referenced technical inadequacies, the present disclosure provides a heating system with wireless communication function. With the increase in popularity of wireless charging, relevant products such as wireless charging transmitters are trending to become one the most sought after products on the market. Accordingly, the present disclosure can expand a range of application of wireless charging products, so that they can not only be used for charging, but can be used to satisfy daily necessities. The present disclosure can effectively solve the drawbacks associated with the related art, such as low efficiency due to multiple energy converting steps, high costs, complexity of hardware structures, and so on.

In one aspect, the present disclosure provides a heating system with wireless communication function. The heating system with wireless communication function includes a wireless charging transmitting device and a wireless receiving heating device. The wireless charging transmitting device includes a shell, a transmitting end coil and a transmitting end magnetic shield. The transmitting end coil is disposed at the top portion of the shell. The transmitting end magnetic shield is disposed within the shell and below the transmitting end coil. The wireless receiving heating device is disposed on a top surface of the wireless charging transmitting device and includes an accommodating part, a metal heating plate, a receiving end magnetic shield, a receiving end wireless communication device and a receiving end coil. The metal heating plate is disposed at the bottom portion of the accommodating part. The receiving end magnetic shield is disposed on a bottom surface of the metal heating plate. The receiving end wireless communication device is disposed on a bottom surface of the receiving end magnetic shield. The receiving end coil is disposed below the receiving end magnetic shield and corresponding in position to the transmitting end coil. The wireless charging transmitting device transmits energy to the wireless receiving heating device by near field induction so that an object within the accommodating part of the wireless receiving heating device can be heated. The wireless receiving heating device notifies the wireless charging heating device to increase or decrease energy transmission in a digital communication manner.

In one aspect, the present disclosure provides a heating system with wireless communication function. The heating system with wireless communication function includes a wireless information transmitting device, a wireless charging transmitting device and a wireless receiving heating device. The wireless information transmitting device includes an external shell, an information transmitting end coil and an information transmitting end magnetic shield. The information transmitting end coil is disposed on the top portion of the external shell. The information transmitting end magnetic shield is disposed within the external shell and below the information transmitting end coil. The wireless charging transmitting device includes a shell, a transmitting end coil and a transmitting end magnetic shield. The transmitting end coil is disposed on the top portion of the shell. The transmitting end magnetic shield is disposed within the shell and below the transmitting end coil. The wireless receiving heating device is disposed on a top surface of the wireless charging transmitting device and includes a metal heating plate, a receiving end magnetic shield, a receiving end wireless communication device and a receiving end coil. The metal heating plate has a top surface on which an object to be heated is disposed. The receiving end magnetic shield is disposed on a bottom surface of the metal heating plate. The receiving end wireless communication device is disposed on a bottom surface of the receiving end magnetic shield. The receiving end coil is disposed below the receiving end magnetic shield and corresponding in position to the transmitting end coil. The wireless charging transmitting device transmits energy to the wireless receiving heating device by near field induction so that the object within the accommodating part of the wireless receiving heating device can be heated. The wireless receiving heating device notifies the wireless charging heating device to increase or decrease energy transmission in a digital communication manner.

DETAILED DESCRIPTION OF THE EXEMPLARY EMBODIMENTS

The present disclosure is a heating system with wireless communication function to implement a wireless charging transmitting device in a smart portable device, and an emitting energy is acquired from the wireless charging transmitting device to heat the upper device. The wireless charging transmitting device implements an electromagnetic induction heating technique using the principles of an Eddy current effect. The electric energy is converted into thermal energy by the change of the magnetic field through the upper ferromagnetic metal. In other words, by using near field induction (also called inductive coupling), the wireless charging transmitting device transmits energy to the upper sensing device. The sensing device uses the received energy for operation, and at the same time to detect the temperature of the converted thermal energy of the ferromagnetic metal. The energy data is transmitted to the lower wireless charging transmitting device by the sensing device, and the temperature value is used to control the energy. Therefore, the energy transmission of the wireless charging transmitting device can be controlled. In the communication method, the upper heating device notifies the wireless charging transmitting device to increase or decrease the electric energy in a digital communication manner to achieve the effect of stabilizing the heating temperature. The transmission of the digital communication can be one-way or two-way communication.

First Embodiment

Figure 1:
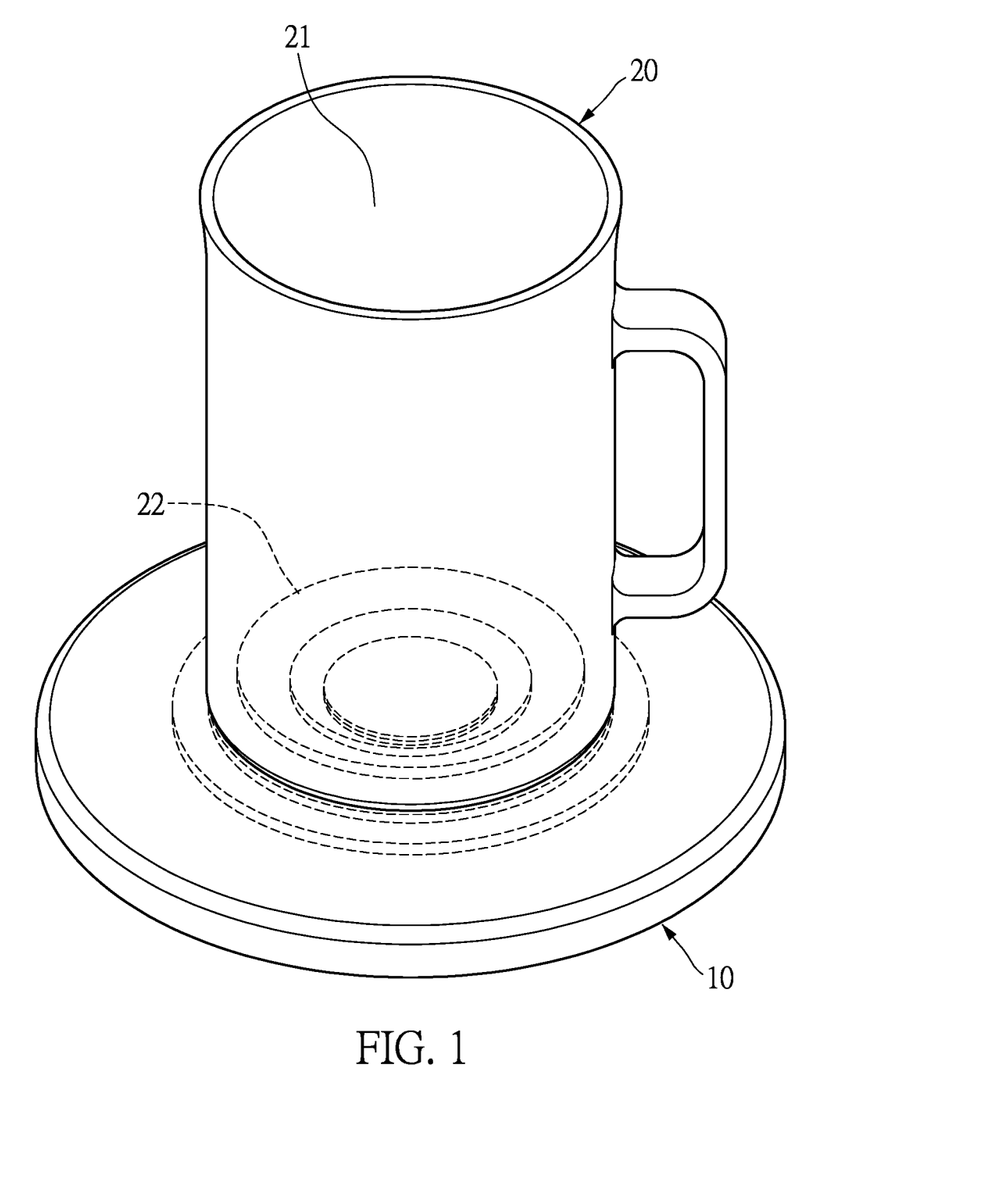
FIG. 1 is a perspective view of a heating system with wireless communication function according to a first embodiment of the present disclosure.

FIG. 1 is a perspective view of a first embodiment of a heating system with wireless communication function in the present disclosure. The heating system with wireless communication function includes a wireless charging transmitting device 10 and a wireless receiving heating device 20. The wireless receiving heating device 20 is disposed on a top surface of the wireless charging transmitting device 10. The wireless receiving heating device 20 in the present disclosure implements the wireless charging transmitting device 10 to acquire the transmitted energy as the energy required for heating an upper device. The wireless charging transmitting device 10 can be the wireless charging transmitting device marked with Wireless Power Consortium (WPC) under Qi standard or related to Alliance for Wireless Power (A4WP) of AirFuel Alliance (AFA) standard.

Figure 2:
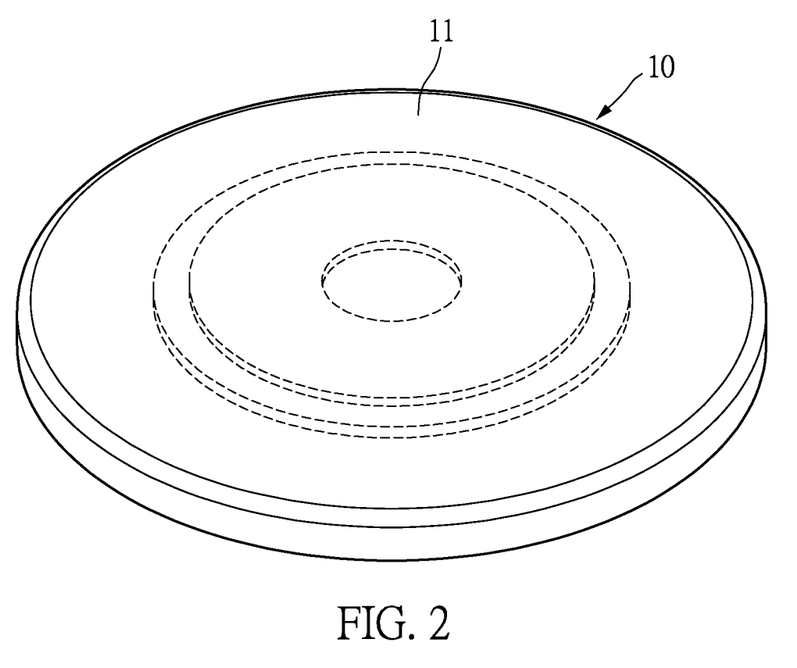
FIG. 2 is a perspective view of the wireless charging transmitting device according to the first embodiment of the present disclosure.

In the wireless receiving heating device 20 of the present disclosure, the wireless charging transmitting device 10 implements an electromagnetic induction heating technique using the principles of an Eddy current effect. The electric energy is converted into thermal energy by the change of the magnetic field through the upper ferromagnetic metal. FIG. 2 is a perspective view of the wireless charging transmitting device 10.

Figure 3:
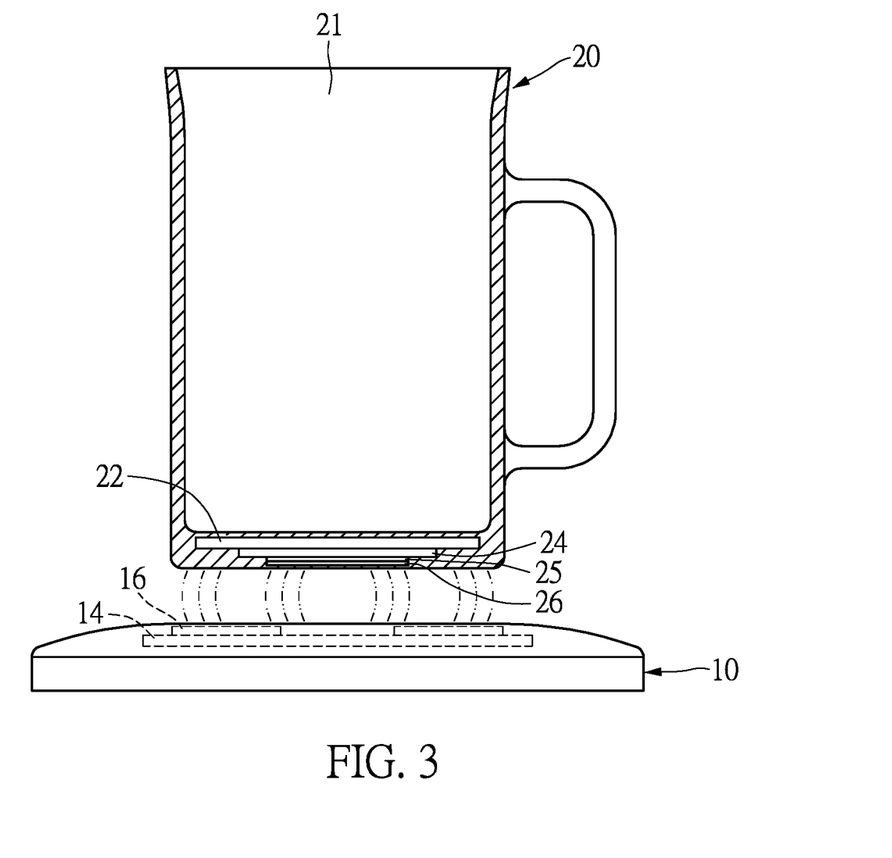
FIG. 3 is a side view according to the first embodiment of the present disclosure.
Figure 4:
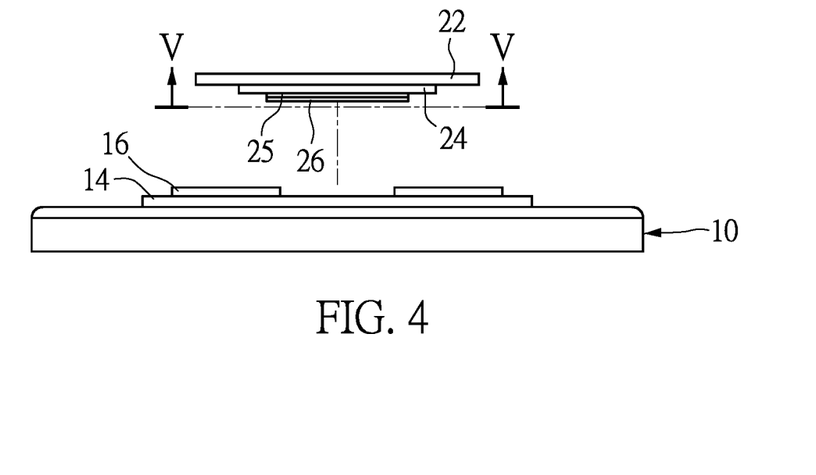
FIG. 4 is a schematic view illustrating internal components of the wireless charging transmitting device according to the first embodiment of the present disclosure.

Referring to FIG. 3 and FIG. 4, the heating system with wireless communication function in the first embodiment of the present disclosure includes the wireless charging transmitting device 10 and the wireless receiving heating device 20. The wireless charging transmitting device 10 includes a shell 11, a transmitting end coil 16 and a transmitting end magnetic shield 14. The appearance of the shell 11 is represented by the shell 11 of the wireless charging transmitting device 10 in FIG. 2. The transmitting end coil 16 is disposed at the top portion of the wireless charging transmitting device 10. The transmitting end magnetic shield 14 is disposed within the shell 11 and located below the transmitting end coil 16. The wireless receiving heating device 20 is disposed on the top surface of the wireless charging transmitting device 10. Specifically, the wireless receiving heating device 20 is disposed on the top surface of the shell 11 of the wireless charging transmitting device 10. The wireless receiving heating device 20 includes an accommodating part 21 (as marked in FIG. 1), a metal heating plate 22, a receiving end magnetic shield 24, a receiving end wireless communication device 25 and a receiving end coil 26. The accommodating part 21 is capable of storing drinks, liquids or objects, which are required to be heated or insulated. The metal heating plate 22 is disposed at the bottom portion of the accommodating part 21. The receiving end magnetic shield 24 is disposed on the bottom surface of the metal heating plate 22. The receiving end wireless communication device 25 is disposed on the bottom surface of the receiving end magnetic shield 24. The receiving end coil 26 is disposed below the receiving end coil 24 and located at a position corresponding to the transmitting end coil 16 within the wireless charging transmitting device 10.

In one embodiment, the receiving end wireless communication device 25 is disposed between the receiving end magnetic shield 24 and the receiving end coil 26. Alternatively, the receiving end wireless communication device 25 and the receiving end coil 26 can be disposed on the same surface. The receiving end wireless communication device 25 is disposed at two sides of the receiving end coil 26. The receiving end wireless communication device 25 is capable of performing the communication between the wireless receiving heating device 20 and the wireless charging transmitting device 10 to transmit signals related to temperature information and signals for controlling temperature.

The wireless charging transmitting device 10 in the present disclosure implements near field induction (inductive coupling) to transmit energy to the wireless receiving heating device 20, so that the object within the accommodating part 21 of the wireless receiving heating device 20 can be heated. The wireless receiving heating device 20 notifies the wireless charging transmitting device 10 in a digital communication manner to increase or decrease energy transmission so as to achieve the effect of controlling the heating temperature.

The metal heating plate 22 is used as a heating area. In the area outside the receiving end magnetic shield 24, when the changed magnetic field encounters a conductor such as a monolithic metal, an eddy current effect is generated. The eddy current will generate a large amount of thermal energy, and the eddy current effect can be used to convert electric energy into the thermal energy, such as in an induction cooker.

The functions of the transmitting end magnetic shield 14 and the receiving end magnetic shield 24 mainly include magnetic conduction and magnetic blocking. With the Qi wireless charging standard as an example, the principle of the magnetic conduction is electromagnetic induction. The wireless charging transmitting end generates an alternating magnetic field. In order to allow the magnetic field energy emitted by the primary coil to act as much as possible on the wireless charging receiving end, the magnetic force of the transmitting end coil 16 needs to be guided. In addition, after the receiving end magnetic shield 24 is added to the receiving end coil 26, the magnetic force lines will be gathered together and concentrated, while the magnetic force lines in the area without the magnetic shield will be dispersed. The area of the receiving end magnetic shield 24 should not only be able to effectively conduct magnetic force, but also have the function of the magnetic blocking. The purpose of the magnetic blocking is to constrain the magnetic field generated by the wireless charging transmitting end, so that the magnetic field can only act in the receiving end coil 26.

The receiving end coil 26 implements a non-contact and close-range coil resonance principle to transfer energy and information. A coil is disposed at each of the receiving end and the transmitting end. The coil at the transmitting end is to generate electromagnetic signals, while the coil at the receiving end is smaller and generates electric energy by sensing the electromagnetic signal from the transmitting end. The energy generated by the coil at the receiving end is provided to the wireless receiving heating device 20 for operation thereof.

Figure 5:
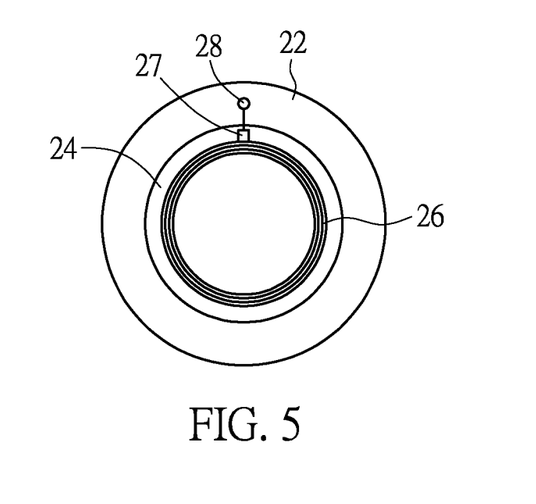
FIG. 5 is a schematic view of the wireless receiving heating device according to the first embodiment of the present disclosure.

FIG. 5 is a schematic view along line V-V of FIG. 4 from a bottom of the metal heating plate 22, the receiving end magnetic shield 24 and the receiving end coil 26 of the wireless receiving heating device 20 shown in FIG. 4. The wireless receiving heating device 20 includes a temperature sensor 28 and a control unit 27. The temperature sensor 28 is disposed below the metal heating plate 22 and configured to detect the temperature of the metal heating plate 22. The control unit 27 is coupled to the temperature sensor 28 and the receiving end coil 26, and disposed below the receiving end magnetic shield 24. The control unit 27 transmits the temperature information to the transmitting end coil 16 through the receiving end coil 26 by a backscatter modulation in a one-way communication manner.

The control unit 27 and the temperature sensor 28 in FIG. 5 are used for temperature detection and wireless communication. When the wireless charging transmitting device 10 performs the energy transmission for the wireless receiving heating device 20, the electromagnetic signal at the transmitting end generates electric energy because of the receiving end coil 26 and provides the energy to the control unit 27. The control unit 27 will then detect temperature by the temperature sensor 28. When the temperature is higher than a predetermined value, the control unit 27 transfers the temperature information to the transmitting end coil 16 by the backscatter modulation and notifies the transmitting end to decrease energy transmission through the receiving end coil 26. When the temperature is less than the predetermined value, the control unit 27 transfers the temperature information to the transmitting end coil 16 by the backscatter modulation and notify the transmitting end to increase energy transmission through the receiving end coil 26 so as to stabilize the temperature.

Figure 6:
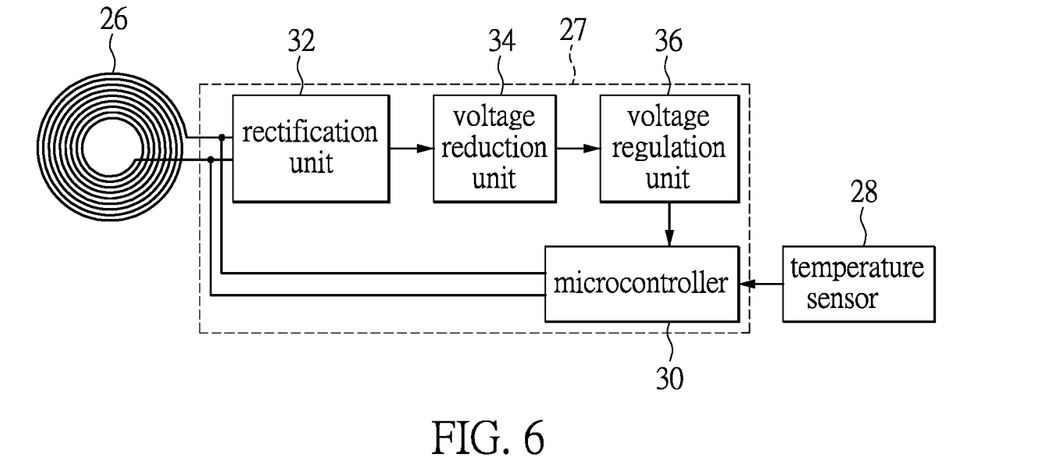
FIG. 6 is a schematic view of a control unit according to the first embodiment of the present disclosure.

FIG. 6 is a block diagram of the components within the control unit 27. The control unit 27 includes a rectification unit 32, a voltage reduction unit 34, a voltage regulation unit 36 and a microcontroller 30. The rectification unit 32 is coupled to the receiving end coil 26 and configured to rectify the electrical signal of the receiving end coil 26. The voltage reduction unit 34 is coupled to the rectification unit 32 and mainly used to perform voltage reduction in the output voltage of the rectification unit 32 so as to reduce the output voltage. The voltage regulation device 36 is coupled to the voltage reduction unit 34 and used to stabilize the output voltage of the voltage reduction unit 32 so as to avoid a condition where the voltage is unstable. The microcontroller 30 is coupled to the voltage regulation device 36, the temperature sensor 28 and two ends of the receiving end coil 26, as shown in FIG. 6, and configured to perform temperature control and wireless communication after detecting the temperature.

Furthermore, the wireless charging transmitting device 10 in the present disclosure transmits energy to the wireless receiving heating device 20 and provides the energy for the operation of the control unit 27 and the temperature sensor 28. The control unit 27 detects the temperature of the thermal energy converted by the ferromagnetic metal and transmits the energy control data to the wireless charging transmitting device 10. Therefore, the energy transmission of the wireless charging transmitting device 10 can be controlled in accordance with the temperature value.

The present disclosure notifies the wireless charging transmitting device 10 to increase or decrease electric energy in a digital communication manner from the wireless receiving heating device 20 so as to achieve the effect of stabilizing the heating temperature. The digital communication manner can be a one-way or two-way communication. In the two-way communication, the wireless charging transmitting device 10 transmits the temperature information to the receiving end coil 26 in a frequency modulation (FM) transmission manner. The temperature information is first transmitted to the receiving end coil 26, and then the temperature information is transmitted back to the transmitting end coil 16 of the wireless charging transmitting device 10 by the backscatter modulation to generate a required control signal. In addition, the backscatter modulation can be used to perform the one-way communication.

Second Embodiment

Figure 7:
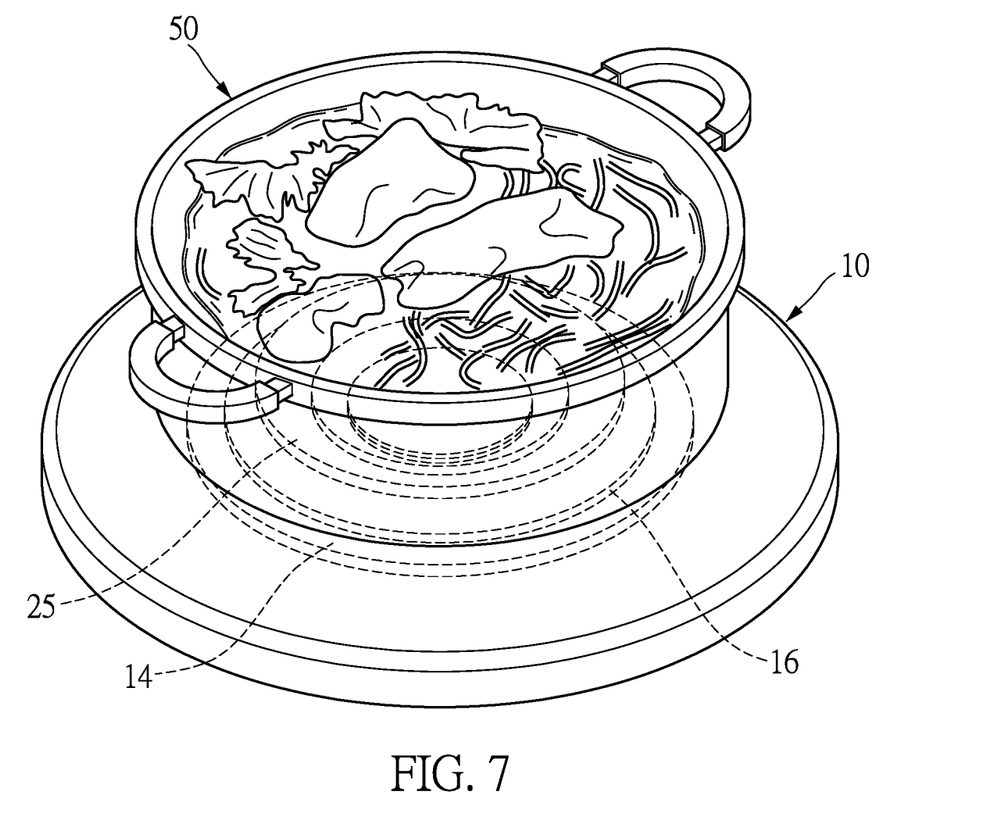
FIG. 7 is a schematic view according to a second embodiment of the present disclosure.

In FIG. 1 of the present invention, an overall appearance of the wireless receiving heating device 20 is a cup-like structure that is used to store drinks or liquids which require heating. FIG. 7 is a perspective view of a second embodiment of the present disclosure. The difference between the wireless receiving heating devices 20 in FIG. 1 and FIG. 7 is that the wireless receiving heating device in FIG. 7 is a bowl 50 that has a bowl-like appearance. The bowl 50 can hold noodle soup, porridge, fried rice, etc. The metal heating plate and the components shown in FIG. 3 are also included at the bottom portion of the wireless receiving heating device 20 in the current embodiment, and repeated description thereof will be omitted herein.

Third Embodiment

Figure 8:
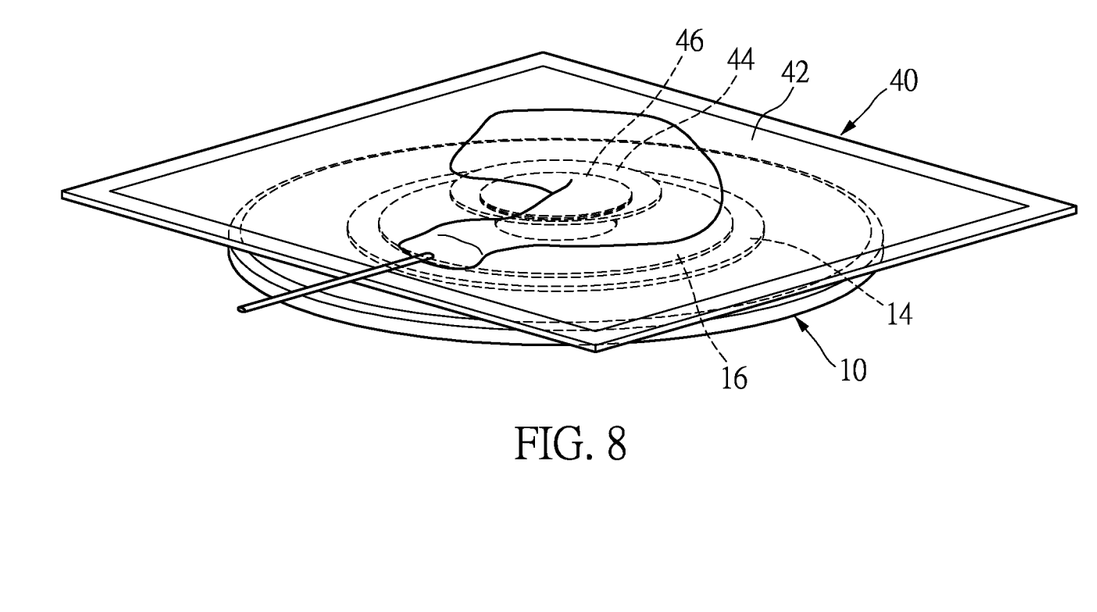
FIG. 8 is a schematic view according to a third embodiment of the present disclosure.

FIG. 8 is a schematic view of a third embodiment of the present disclosure. The difference between the first embodiment and the third embodiment is that the heating system in the third embodiment can be used to heat and defrost food. The wireless receiving heating device 40 has the shape and structure of a metal plate, i.e., a metal heating plate 42 as shown in FIG. 8. The accommodating part is the top surface of the metal heating plate 42. Aside from the foregoing configuration, the third embodiment of the present disclosure can also be configured with a single one of the wireless charging transmitting device 10. Alternatively, the present disclosure can adopt another configuration where a wireless information transmitting device 10a is implemented in addition to the wireless charging transmitting device 10, which can be taken as a fourth embodiment of the present disclosure as shown in FIG. 9.

In the third embodiment of the present disclosure shown in FIG. 8, when only one wireless charging transmitting device 10 is implemented, the heating system with wireless communication function includes a wireless charging transmitting device 10 and a wireless receiving heating device 40. The wireless charging transmitting device 10 also includes a shell (not shown in FIG. 8), a transmitting end coil 16 and a transmitting end magnetic shield 14. The transmitting end coil 16 is disposed at a top portion of the shell. The transmitting end magnetic shield 14 is disposed within the shell and located below the transmitting end coil 16. The wireless receiving heating device 40 is also disposed on the top surface of the wireless charging transmitting device 10. The wireless receiving heating device 40 includes a metal heating plate 42, a receiving end magnetic shield 44, a receiving end wireless communication device (not shown in the figure) and a receiving end coil 46. The top surface of the metal heating plate 42 is used to accommodate the object to be heated. For example, fish, beef strips or chicken legs can be disposed on the metal heating plate 42 to be defrosted. The heating system in the present disclosure can be used to thaw frozen food. The receiving end magnetic shield 44 is disposed on the bottom surface of the receiving end coil 46 and corresponding in position to the transmitting end coil 16. The wireless receiving heating device 10 transfers energy to the wireless receiving heating device 40 by near field induction so that the object on the wireless receiving heating device 40 can be heated. The wireless receiving heating device 40 notifies the wireless charging transmitting device 10 to increase or decrease the energy transmission.

Fourth Embodiment

Figure 9:
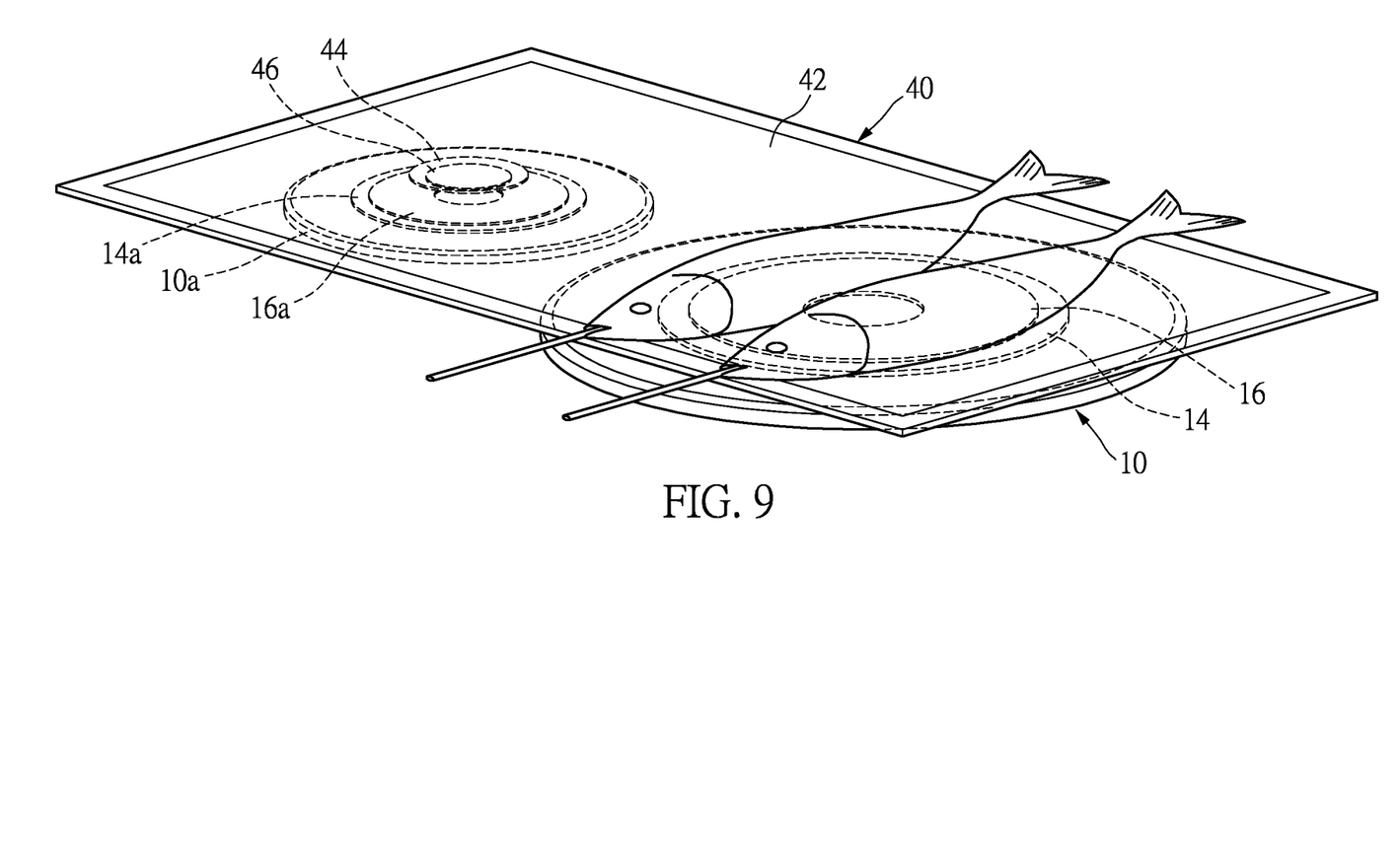
FIG. 9 is a schematic view according to a fourth embodiment of the present disclosure.

Alternatively, in a fourth embodiment of the present disclosure shown in FIG. 9, a wireless information transmitting device 10a is implemented in addition to the wireless charging transmitting device 10. The receiving end coil 46 of the wireless receiving heating device 40 and the metal heating plate 42 in the fourth embodiment respectively correspond in position to different locations. The wireless information transmitting device 10a includes an external shell (not shown in FIG. 9), an information transmitting end coil 16a and an information transmitting end magnetic shield 14a. The information transmitting end coil 16a is disposed at the top portion of the external shell. The information transmitting end magnetic shield 14a is disposed within the external shell and below the information transmitting end coil 16a.

As shown in FIG. 9, the information transmitting end coil 16a of the wireless information transmitting device 10a and the transmitting coil 16, which is used to generate heat, in the wireless charging transmitting device 10 are separated at different locations. The transmitting end coil 16 of the wireless charging transmitting device 10 used as the heating coil transmits the energy to the upper metal heating plate 42. In addition, the wireless information transmitting device 10a provides the energy to the control unit 27 and the temperature sensor 28 for operation thereof. The control unit 27 and the temperature sensor 28 are disposed in the same manner as that in the first embodiment. The control unit 27 detects the temperature of the thermal energy converted by the ferromagnetic metal and transmits the energy control data to the lower wireless information transmitting device 10a, and the energy is controlled according to the temperature value. Therefore, the energy transmission of the wireless charging transmitting device can be controlled.

Similarly, the digital communication manner in the fourth embodiment can be the one-way communication and the two-way communication. In the two-way communication, the wireless information transmitting device 10a transmits information to the receiving end coil 46 in the frequency modulation manner and then transmits the temperature information back to the information transmitting end coil 16a by the backscatter modulation to provide a control signal for the wireless information transmitting device 10a. The one-way communication can also be implemented by using the backscatter modulation.

In conclusion, present disclosure is able to expand the range of application of the wireless charging products or devices. The wireless charging products can not only be used to charge power, but can be used to satisfy daily necessities, such as being used with thermos cups, thermos bottles, insulated bowls, children's feeding bowls, food thawing boards, and so on.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A heating system with wireless communication function, comprising:
   a wireless charging transmitting device, including:
      a shell;
      a transmitting end coil disposed at the top portion of the shell; and
      a transmitting end magnetic shield disposed within the shell and below the transmitting end coil; and
   a wireless receiving heating device disposed on a top surface of the wireless charging transmitting device and including:
      an accommodating part;
      a metal heating plate disposed at the bottom portion of the accommodating part;
      a receiving end magnetic shield disposed on a bottom surface of the metal heating plate;
      a receiving end wireless communication device disposed on a bottom surface of the receiving end magnetic shield; and
      a receiving end coil disposed below the receiving end magnetic shield and corresponding in position to the transmitting end coil;
   wherein the wireless charging transmitting device transmits energy to the wireless receiving heating device by near field induction so that an object within the accommodating part of the wireless receiving heating device can be heated; the wireless receiving heating device notifies the wireless charging heating device to increase or decrease energy transmission in a digital communication manner.

2. The heating system with wireless communication function according to claim 1, wherein the wireless receiving heating device further includes:
a temperature sensor disposed below the metal heating plate and configured to detect temperature of the metal heating plate; and
a control unit coupled to the temperature sensor and the receiving end coil, and being disposed below the receiving end magnetic shield; the control unit transmitting temperature information to the transmitting end coil via the receiving end coil by a backscatter modulation.

3. The heating system with wireless communication function according to claim 2, wherein the control unit includes:
a rectification unit coupled to the receiving end coil and rectifying electrical signal of the receiving end coil;
a voltage reduction unit coupled to the rectification unit and performing voltage reduction for output voltage of the rectification unit;
a voltage regulation unit coupled to the voltage reduction unit and configured to stabilize output voltage of the voltage reduction unit; and
a microcontroller coupled to the voltage regulation unit, the temperature sensor, and two ends of the receiving end coil, and configured to perform temperature control and wireless information transmission after detecting temperature.

4. The heating system with wireless communication function according to claim 2, wherein when the wireless charging transmitting device and the wireless receiving heating device engage in two-way communication, the wireless charging transmitting device transmits information to the receiving end coil by transmitting a modulation signal, and the receiving end coil transmits a control signal for information transmission to the transmitting end coil by the backscatter modulation.

5. The heating system with wireless communication function according to claim 1, wherein the wireless receiving heating device is a cup-like or a bowl-like structure.

6. The heating system with wireless communication function according to claim 1, wherein an overall appearance of the wireless receiving heating device is in the shape of a metal plate, and the accommodating part is a top surface of the metal heating plate.

7. A heating system with wireless communication function, comprising:
a wireless information transmitting device, including:
an external shell;
an information transmitting end coil disposed on the top portion of the external shell; and
an information transmitting end magnetic shield disposed within the external shell and below the information transmitting end coil;
a wireless charging transmitting device, including:
a shell;
a transmitting end coil disposed on the top portion of the shell; and
a transmitting end magnetic shield disposed within the shell and below the transmitting end coil; and
a wireless receiving heating device disposed on a top surface of the wireless charging transmitting device and including:
a metal heating plate having a top surface on which an object to be heated is disposed;
a receiving end magnetic shield disposed on a bottom surface of the metal heating plate;
a receiving end wireless communication device disposed on a bottom surface of the receiving end magnetic shield; and
a receiving end coil disposed below the receiving end magnetic shield and corresponding in position to the transmitting end coil;
wherein the wireless charging transmitting device transmits energy to the wireless receiving heating device by near field induction and the object within the accommodating part of the wireless receiving heating device can be heated; the wireless receiving heating device notifies the wireless charging heating device to increase or decrease energy transmission in a digital communication manner.

8. The heating system with wireless communication function according to claim 7, wherein the wireless receiving heating device includes:
a temperature sensor disposed below the metal heating plate and configured to detect temperature of the metal heating plate; and
a control unit coupled to the temperature sensor and the receiving end coil, and being disposed below the receiving end magnetic shield; the control unit transmitting temperature information to the transmitting end coil via the receiving end coil by a backscatter modulation.

9. The heating system with wireless communication function according to claim 8, wherein the control unit includes:
a rectification unit coupled to the receiving end coil and rectifying electrical signal of the receiving end coil;
a voltage reduction unit coupled to the rectification unit and performing voltage reduction for output voltage of the rectification unit;
a voltage regulation unit coupled to the voltage reduction unit and configured to stabilize output voltage of the voltage reduction unit; and
a microcontroller coupled to the voltage regulation unit, the temperature sensor, and two ends of the receiving end coil, and configured to perform temperature control and wireless communication transmission after detecting temperature.

10. The heating system with wireless communication function according to claim 7, wherein when the wireless charging transmitting device and the wireless receiving heating device engage in two-way communication, the wireless charging transmitting device transmits information to the receiving end coil by transmitting a modulation signal and the receiving end coil transmits a control signal for information transmission to the transmitting end coil by the backscatter modulation.

\* \* \* \* \*